United States Patent
Bernard

(10) Patent No.: US 10,888,101 B2
(45) Date of Patent: Jan. 12, 2021

(54) CONFECTIONERY COMPOSITION AND A METHOD OF MANUFACTURING THEREOF

(71) Applicant: Smith & Sinclair Limited, London Greater London (GB)

(72) Inventor: Emile Bernard, London Greater London (GB)

( * ) Notice: Subject to any disclaimer, the term of this patent is extended or adjusted under 35 U.S.C. 154(b) by 175 days.

(21) Appl. No.: 15/546,892

(22) PCT Filed: Jan. 25, 2016

(86) PCT No.: PCT/EP2016/051398
§ 371 (c)(1),
(2) Date: Jul. 27, 2017

(87) PCT Pub. No.: WO2016/120179
PCT Pub. Date: Aug. 4, 2016

(65) Prior Publication Data
US 2018/0007929 A1    Jan. 11, 2018

(30) Foreign Application Priority Data

Jan. 28, 2015   (GB) .................................. 1501413.7

(51) Int. Cl.
| | | |
|---|---|---|
| A23G 3/54 | (2006.01) | |
| A23L 29/231 | (2016.01) | |
| A23G 3/36 | (2006.01) | |
| A23L 29/256 | (2016.01) | |
| A23L 29/281 | (2016.01) | |
| A23G 3/34 | (2006.01) | |

(52) U.S. Cl.
CPC .............. *A23G 3/54* (2013.01); *A23G 3/0014* (2013.01); *A23G 3/36* (2013.01); *A23L 29/231* (2016.08); *A23L 29/256* (2016.08); *A23L 29/284* (2016.08); *A23G 2220/20* (2013.01)

(58) Field of Classification Search
CPC ..... A23L 29/231; A23L 29/256; A23L 29/284
USPC .................................. 426/573, 575, 576, 577
See application file for complete search history.

(56) References Cited

U.S. PATENT DOCUMENTS

2013/0273211 A1    10/2013    Virgallito

FOREIGN PATENT DOCUMENTS

| DE | 202006005520 U | 8/2006 |
|---|---|---|
| WO | WO98/12935 A1 | 4/1998 |
| WO | WO 01/28359 A1 | 4/2001 |
| WO | WO2006/107238 A1 | 10/2006 |

OTHER PUBLICATIONS https://www.probrewer.com/tools/percent-alcohol-conversion-calculator/-conversion of 40% and 50% alcohol by weight to volume (Year: 2019).*
Burey et al., nternational Journal of Food Properties, Confectionery Gels: A Review on Formulation, Rheological and Structural Aspects,International Journal of Food Properties, 12: 176-210, 2009 (Year: 2009).*
Smith & Sinclair, Oct. 22, 2014, Bobbing for Apples, Youtube, http:/youtube.com watch?v=C0wjLzAfkk.
Alco Candy, Sep. 2, 2012, "How to make whisky gums," Youtube, http:/www.youtube.com/watch?v=G83jyth3Spc.

* cited by examiner

*Primary Examiner* — Jyoti Chawla

(57) ABSTRACT

The present invention relates to a sugar confectionery composition comprising an alcohol-containing phase and a sweet-containing phase, wherein the composition, when set, is in the form of a single-phase amorphous mass. The invention also relates to a method of manufacturing a sugar confectionery composition, comprising steps of: preparing an alcohol-containing phase at a first temperature; preparing a sweet-containing phase at a second temperature; incorporating one of the two phases into another to form a mixture; setting the mixture to form the composition; wherein, when set, the composition is in the form of a single-phase amorphous mass.

6 Claims, 1 Drawing Sheet

CONFECTIONERY COMPOSITION AND A METHOD OF MANUFACTURING THEREOF

FIELD OF THE INVENTION

The present invention relates to an alcohol-containing confectionery and a method of manufacturing thereof.

BACKGROUND OF THE INVENTION

Various sugar confectioneries including candies, chocolates, marshmallows, pastilles and gums have been manufactured with a large variety of flavours, forms and textures. In addition to the common fruit-flavoured sweets which are popular among consumers of all ages, alcohol-containing confectionery such as liquor-filled chocolates are also widely sought after as a treat for adult consumers. Regardless of the growing interests and demands on alcohol-containing confectionery, however, the varieties and thus the selections available in the market are still, relatively limited.

OBJECT OF THE INVENTION

An object of the present invention is thus to provide a confectionery composition and a method of manufacturing thereof, in which the aforesaid shortcomings are mitigated or obviated to some degree, or at least to provide a useful alternative.

One skilled in the art will derive from the following description other objects of the invention. Therefore, the foregoing statement of object is not exhaustive and serves merely to illustrate some of the many objects of the present invention.

SUMMARY OF THE INVENTION

The summary of the invention does not necessarily disclose all the features essential for defining the invention; the invention may reside in a sub-combination of the disclosed features.

In one main aspect of the present invention, it provides a confectionery composition comprising an alcohol-containing phase and a sweet-containing phase, wherein the composition, when set, is in the form of a single-phase amorphous mass.

In a second main aspect of the present invention, it provides a method of manufacturing a confectionery composition, comprising steps of preparing an alcohol-containing phase at a first temperature; preparing a sweet-containing phase at a second temperature; incorporating one of the two phases into another to form a mixture; setting the mixture to form the composition; wherein, when set, the composition is in the form of a single-phase amorphous mass.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DETAILED DESCRIPTION OF THE PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
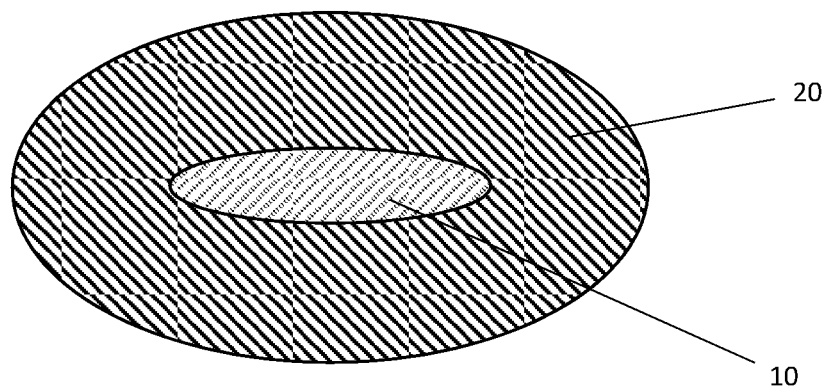
FIG. 1 is a schematic diagram showing a conventional alcohol-containing confectionery.

The present invention provides a confectionery composition and a method of manufacturing such confectionery composition which contains, when set, a relatively high percentage of alcohol. Specifically, in one embodiment of the present invention the confectionery composition comprises a first phase containing at least one alcohol, and a second phase containing at least one sweet-flavoured substance such as glucose, sugar or a combination thereof. When the composition is set, i.e. thickened, gelled or solidified, the composition is in the form of a single-phased, semi-solid (e.g. a paste) or solid amorphous mass, with no liquid form of the alcohol being enclosed or encapsulated in sub-regions of the composition. This is in contrast to the traditional alcohol-containing confectionery in the prior art (as shown in FIG. 1), which generally include a liquid-containing core 10 being coated with the confectionery composition 20 such as chocolate.

In the context of this description, the term "sweet-flavoured substance" is generally referring to edible sweets of any type including simple sugars or monosaccharides such as glucose, fructose and galactose; disaccharides such as sucrose (including table sugar, caster sugar, granulated sugar or the like), maltose or lactose; other natural sweeteners (such as maple sugar, honey or nectar) or artificial sweeteners (such as xylito). A person skilled in the art would appreciate that the present invention should not be limited to the embodied examples, but any sweet-flavoured substances, compounds or additives which are considered suitable for the claimed purpose would also be encompassed.

Figure 2:
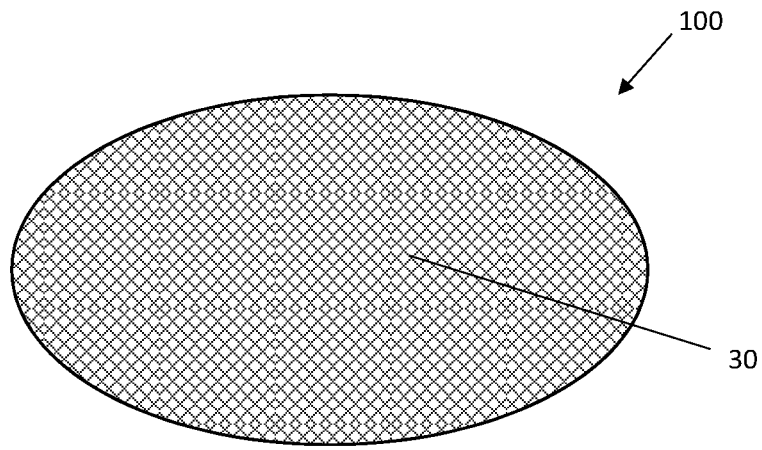
FIG. 2 is a schematic diagram showing an embodiment of the alcohol-containing confectionery of the present invention.

FIG. 2 shows an alcohol-containing confectionery composition as embodied in the present invention. The confectionery composition 100 comprises an alcohol-containing phase having at least one alcohol and a sweet-containing phase having at least one sweet-flavoured substance. The composition, when set, is in the form of a single-phase amorphous mass 30 as shown in the figure, with no discrete liquid form of the alcohol being enclosed or encapsulated in the composition Various consumable alcohols can be used in the preparing of the confectionery composition of the present invention. In one embodiment, the concentration of alcohol in the alcohol-containing phase may range from about 36% to 60% by total volume of the phase.

The alcohol-containing phase may further comprise at least one settling agent for thickening or solidifying the composition. The composition, when set, i.e. thickened or solidified, is in the form of a single-phase amorphous mass 30 with no discrete liquid-containing sub-regions. Specifically, the amorphous mass 30 comprises a substantially homogenous mix of alcohol and other ingredients in a matrix. The setting effect can be resulted from a physical reaction such as emulsification of the other ingredients by the setting agent, and/or a chemical reaction such as cross-linking of the long-chained polymers in the setting agent. Preferably, the confectionery is a pastille or a gum-based composition having an alcohol concentration of about 5 to 8% by volume when set.

The setting effect can be thickening, gelling or solidifying of the components in the formulation, and the setting agent can be selected from a range of different thickening agents, gelling agents and/or solidifying agents depending on the requirements of the specific formulations or applications. Preferably, the setting agent can be selected from a group consisting of gelatin, pectin, agar, carrageenan or a mixture thereof. Again, the skilled person would appreciate that the invention should not be limited to these examples of setting agent, but any other agents or additives which are capable of achieving the claimed effect should also be encompassed.

In one embodiment, the sweet-containing phase comprises glucose and granulated or caster sugar to provide the sweetness to the composition. Preferably, the amount of glucose should be more than sugar in the sweet-containing phase so as to reduce the chance of crystallization of the sugar at the elevated temperature. Nevertheless, it is not preferable to use glucose alone in the formulation, as glucose is generally very sensitive to temperature change and therefore, not desirable to be used alone for stability reason. Preferably, the ratio of glucose to sugar in the sweet-containing phase is ranged from about 5:3, and more preferably about 9:7.

The composition may also comprise other ingredients or excipients such as fruit juices, flavourings, stabilisers, emulsifiers, preservatives, colourings, sweeteners or a mixture thereof, depending on the specific flavour, form and texture required for the end confectionery products. These ingredients or excipients can be included in any one or both of the two phases, as long as the added ingredients or excipients are soluble and compatible in the phases.

In another embodiment of the present invention, there is provided a method of manufacturing a confectionery composition. The method comprises steps of preparing an alcohol-containing phase at a first temperature; preparing a sweet-containing phase at a second temperature; incorporating one of the two phases into another to form a mixture; setting the mixture to form the composition. The formed composition, when set, is in the form of a single-phase amorphous mass with no discrete liquid-containing sub-regions, and specifically, comprises a substantially homogenous mix of alcohol and other ingredients in a thickened, gelled or solidified matrix.

Specifically, the method involves dissolving at least one setting agent into at least one alcohol to form the alcohol-containing phase, and dissolving at least one sweet-flavoured substance such as glucose and sugar into a solvent such as water, or water/alcohol mixture to form the sweet-containing phase. In one embodiment, the alcohol-containing phase and the sweet-containing phase are prepared at a weight ratio ranged from about 1:1 to about 1:2, and the alcohol-containing phase may comprise setting agent of a concentration ranged from about 5% to about 15%.

Both the alcohol-containing phase and the sweet-containing phase are generally required to be prepared at an elevated temperature to allow a full dissolution or melting of the setting agent and the glucose and sugar, respectively. Specifically, the alcohol-containing phase will be prepared at a temperature well below the boiling point of the alcohol composition, such as 30° C. to 60° C., preferably 40° C. On the other hand, the sweet-containing phase will be prepared at a higher temperature, which can be ranged 120° C. to 140° C., preferably 130° C., so as to provide sufficient heat to totally melt the glucose and the sugar in the mixture. The preparation of the two initial phases and the substantial temperature difference between the two phases are in contrast to the traditional manufacturing practice of sugar confectionery, in which the pastille or gum confectioneries are typically made in one pot at one, high temperature.

The two separate mixtures at two different temperatures will be slowly incorporated into one another. In one embodiment, the alcohol-containing phase will be added slowly in repeated small portions to the sweet-containing phase, followed with subsequent mixing and intermediate setting of the mixture between each addition. The mixing step can be conducted at a rate at low to medium speed. In one embodiment, the sweet-containing phase can be prepared at about 130° C. prior to the mixing in by the alcohol-containing phase, and each addition of the small portion of the alcohol-containing phase may bring down the temperature of the sweet-containing phase by about 7° C. After several additions of the alcohol-containing phase in small portions into the sweet-containing phase (followed with subsequent mixing and intermediate setting), and when the overall temperature of the mixture is at about 60° C. to about 65° C., the remaining portion of the alcohol-containing phase will be fully incorporated into the mixture. The temperature of the fully incorporated mixture after thorough mixing will come down to about 50° C. to about 60° C. It is observed that if the remaining alcohol-containing phase is to be added into the mixture when the mixture is at a temperature below 50° C., the mixture will become too thick to mix which will result in a lower concentration of alcohol in the final composition. On the other hand, if the remaining alcohol-containing phase is to be added into the mixture when the mixture is at a temperature between 65 and 80° C., a significant amount of alcohol will be boiled off or evaporated during the mixing process and thus, a lower concentration of alcohol in the final composition will also be resulted. Accordingly, the temperature of the mixture at which the majority of the alcohol-containing phase is to be added in the mixture is critical in order to achieve a high alcohol content in the final composition.

To maintain a high alcohol content in the final composition, it is important that the initial alcohol concentration in the alcohol-containing phase is at least 40% by volume and preferably, about 40% to 60% by volume.

The steps of setting of the composition after the full incorporation of the two phases and also the intermediate setting between two consecutive additions of small portion of the alcohol-containing phase into the sweet-containing phase can be in the form of thickening, gelling and/or solidifying of the mixture, and the setting effect can be resulted from a physical reaction such as emulsification of the other ingredients by the setting agent, and/or a chemical reaction such as crosslinking of the long-chained polymers in the setting agent.

In a further embodiment of the present invention, there is provided a confectionery product comprising the embodied confectionery composition as described earlier. The confectionery product may further comprise a coating composition for coating the confectionery composition to enhance stability of the composition and/or to further modify the composition to introduce additional flavours. For example, a pastille or gum based composition can be coated with sugar or mineral oil to avoid the confectionery from sticking with one another, and also to improve the flavour of the confectionery. The composition can also be coated with food items such as chocolate, nuts, dried fruits, candies, marshmallow etc. to allow variation of tastes to the confectionary composition.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of manufacturing a confectionery composition, comprising steps of:
preparing an alcohol-containing phase comprising about 36% to about 60% alcohol by volume at a first temperature from about 30° C. to about 60° C.;
preparing a sweet-containing phase at a second temperature where the second temperature is higher than the first temperature, the second temperature being from about 120° C. to about 140° C.;
incorporating a minority portion of the alcohol-containing phase into the sweet-containing phase followed by mixing and intermediate setting to form a mixture having a lower temperature than the second temperature of the sweet-containing phase;
incorporating a further minority portion of the alcohol-containing phase into the lower temperature mixture followed by mixing and intermediate setting;
repeating the step of incorporating a further minority portion of the alcohol-containing phase into the lower temperature mixture followed by mixing and intermediate setting until a third temperature of said lower temperature mixture ranges from about 60° C. to about 65° C. and then fully incorporating a remaining portion of the alcohol-containing phase into the lower temperature mixture;
allowing the resultant mixture to set to form the composition;
wherein, when set, the composition is in the form of a single-phase amorphous mass.

2. The method of manufacturing a confectionery composition according to claim 1, wherein the alcohol-containing phase and the sweet-containing phase are at a weight ratio ranged from about 1:1 to about 1:2.

3. The method of manufacturing a confectionery composition according to claim 1, wherein the step of preparing the alcohol-containing phase comprises step of dissolving at least one setting agent in at least one alcohol.

4. The method of manufacturing a confectionery composition according to claim 1, wherein the step of preparing the sweet-containing phase comprises step of dissolving at least one sweet-flavoured substance in a solvent.

5. The method of manufacturing a confectionery composition according to claim 3, wherein the at least one setting agent is at a concentration ranged from about 5% to about 15%.

6. The method of manufacturing a confectionery composition according to claim 1, wherein the setting step comprises at least one step of thickening, gelling and solidifying.

* * * * *